United States Patent
Scheurenbrand et al.

[11] Patent Number: 5,647,335
[45] Date of Patent: Jul. 15, 1997

[54] MOTOR VEHICLE FUEL SUPPLY SYSTEM WITH FUEL TANK DEVENTILATING DEVICE

[75] Inventors: Dieter Scheurenbrand, Wolfschlugen; Hartmut Kolb, Ludwigsburg; Manfred Weil, Schorndorf, all of Germany

[73] Assignee: Mercedes-Benz AG, Stuttgart, Germany

[21] Appl. No.: 565,163

[22] Filed: Nov. 30, 1995

[30] Foreign Application Priority Data

Nov. 30, 1994 [DE] Germany ............... 44 42 544.9

[51] Int. Cl.⁶ ............. F02M 33/02; B60K 15/035
[52] U.S. Cl. ............. 123/520; 137/587; 123/519
[58] Field of Search ............ 123/516, 518, 123/519, 520; 137/587

[56] References Cited

U.S. PATENT DOCUMENTS

| | | | |
|---|---|---|---|
| 5,146,902 | 9/1992 | Cook et al. ............ | 123/518 |
| 5,363,828 | 11/1994 | Yamashita et al. ...... | 123/520 |
| 5,383,438 | 1/1995 | Blumenstock .......... | 123/520 |
| 5,411,004 | 5/1995 | Busato et al. ........... | 123/520 |
| 5,429,097 | 7/1995 | Wojts-Saary et al. . | |
| 5,437,256 | 8/1995 | Woletz et al. .......... | 123/520 |
| 5,460,143 | 10/1995 | Narita .................. | 123/520 |
| 5,463,998 | 11/1995 | Denz et al. ............ | 123/520 |

FOREIGN PATENT DOCUMENTS

| | | |
|---|---|---|
| 4216067A1 | 11/1993 | Germany. |
| WO93/10992 | 6/1993 | WIPO. |

*Primary Examiner*—Thomas N. Moulis
*Attorney, Agent, or Firm*—Evenson McKeown Edwards & Lenahan, PLLC

[57] ABSTRACT

A deventilating device for motor vehicles is disclosed. The deventilating device allows, in the fuel tank and connected system parts, a limited overpressure which, on the one hand, is safe and, on the other hand, affords the possibility of checking the tightness of the system by on-board means specific to the vehicle.

4 Claims, 1 Drawing Sheet

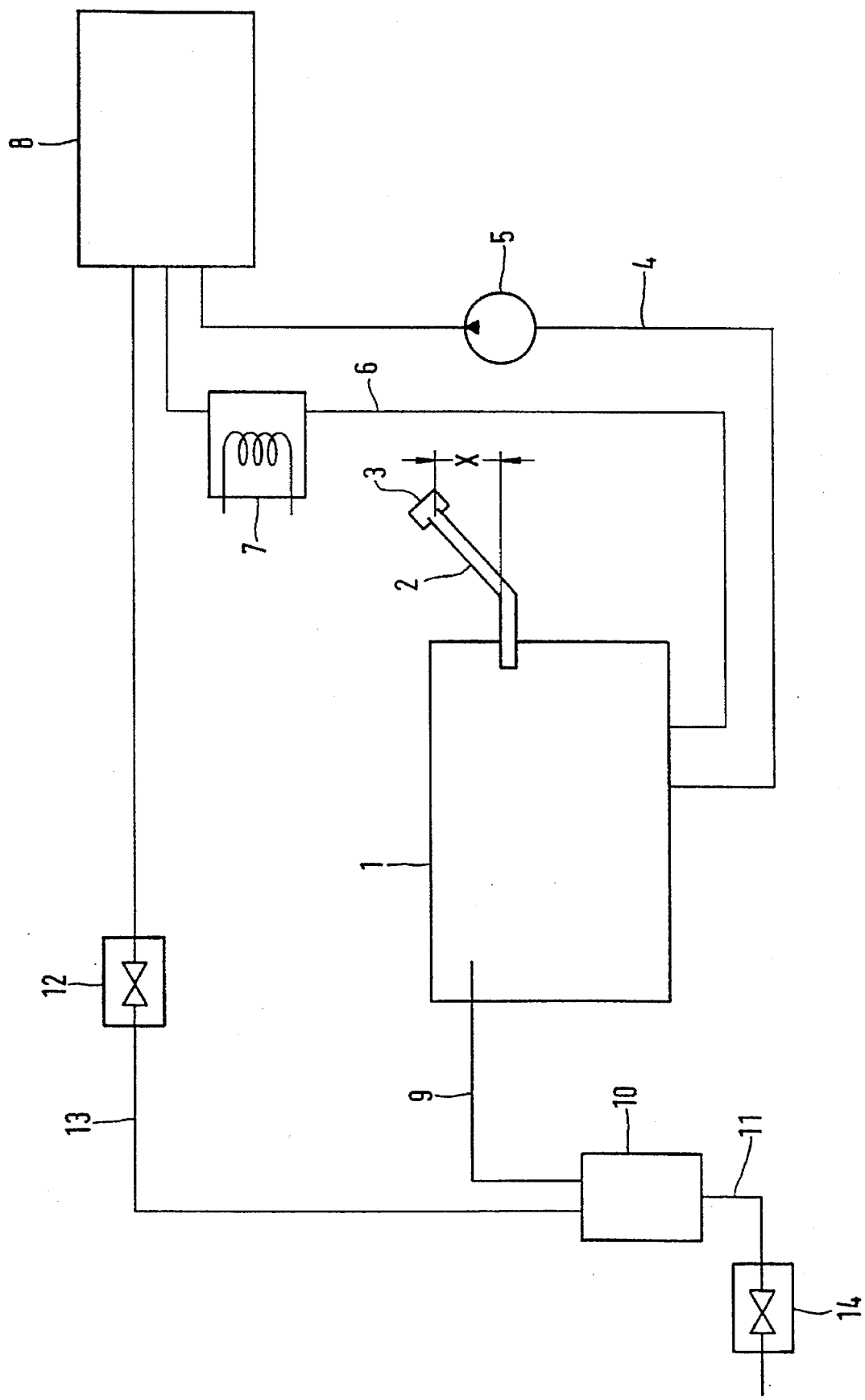

MOTOR VEHICLE FUEL SUPPLY SYSTEM WITH FUEL TANK DEVENTILATING DEVICE

BACKGROUND AND SUMMARY OF THE INVENTION

The invention relates to a motor vehicle fuel supply system with a deventilating device for a fuel tank fillable via a filler pipe, with an outwardly gas-tight deventilating path between the tank and a filter chamber for a regenerable filter medium retaining fuel vapors, as well as with a ventilating orifice arranged on the filter chamber and with an outwardly gas-tight connecting path which connects the filter chamber to an underpressure source, for example the vehicle engine, and which can be shut off by a valve (regenerating valve).

A deventilating device of this type is known from German Patent Document DE 2,416,067 A1. In this device there is a valve assembly arranged on the ventilating orifice which closes the ventilating orifice only when an underpressure which is lower than a predetermined threshold value prevails in the filter chamber in relation to atmospheric pressure.

Moreover, deventilating devices of this type are already used as standard.

The deventilation of the tank can take place only via the filter chamber, in which retained by the filter medium present there, for fuel vapors are example activated charcoal. The filter medium can be regenerated regularly by connecting the filter chamber to the intake side of the vehicle engine, so that the engine receives fresh air via the filter chamber, with the result that the fuel vapors previously absorbed by the filter medium are entrained to the engine and are burnt there.

The requirement has arisen in the meantime to have the capability of checking the gas-tightness of the fuel system and the associated deventilating device by means specific to the vehicle.

An object of the invention is to provide an arrangement which is optimum for the purpose of satisfying this last mentioned requirement.

In a deventilating device of the type specified above this object is achieved according to preferred embodiments of the invention by arranging a valve assembly at the ventilating orifice which closes the ventilating orifice only when an overpressure falling below a threshold value prevails in the filter chamber in relation to atmospheric pressure, and characterized in that this threshold value has approximately the value of that maximum pressure which can be generated by fuel received in the filler pipe. It is also appropriate for the threshold value to also be somewhat slightly above this value according to certain preferred embodiments.

The invention is based on the general idea, on the one hand, of allowing overpressure in the tank system, so that the tightness of the system can be checked quickly. On the other hand, the possible overpressure remains sufficiently limited for it to be possible to rule out any dangerous operating states. Since the possible overpressure is near the maximum pressure which can be generated by fuel in the filler pipe, this ensures at the same time that the automatic cut-off mechanism preventing an overfilling of the tank on fuel-dispensing pumps at the filling stations can work in a fault-free manner.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows a representation of a fuel-tank system with a deventilating device according to the invention, the representation resembling a circuit diagram.

DETAILED DESCRIPTION OF THE DRAWINGS

A fuel tank 1 can be filled via a filler pipe 2, of which the inlet orifice sealingly closable by means of a cap 3 is located above its tank-side mouth by an amount X.

The tank 1 is sealingly connected to an internal combustion engine 8 via a fuel forward-flow conduit 4 having a fuel pump 5 and via a return-flow conduit 6 which, as appropriate, can be provided with a fuel cooler 7.

A gas-tight deventilating conduit 9 leads from a region of the fuel tank 1 above the tank-side mouth of the filler pipe 2 to a filter chamber 10 which receives activated charcoal or another filter medium suitable for the adsorption or absorption of fuel vapors.

The filter chamber 10 possesses a ventilating orifice or ventilating conduit 11 and, moreover, is connected to the intake side of the internal-combustion engine 8 via a regenerating conduit 13 controlled by a regenerating valve 12. During operation, the internal combustion engine 8 constitutes an underpressure source which, when the regenerating valve 12 is open, makes it possible to suck in through the filter chamber 10, via the ventilating orifice or ventilating conduit 11, fresh air by which the fuel absorbed by the filter medium in the filter chamber 10 is then entrained as fuel vapor to the engine 8 and can be burnt there. The filter medium in the filter chamber 10 consequently always remains sufficiently absorbent, as appropriate, to absorb fuel vapors coming from the tank 1 and to keep them away from the atmosphere.

A particular advantageous feature of the invention is that the ventilating orifice or ventilating conduit 11 has arranged on it a valve assembly 14 which opens, on the one hand, when there is underpressure in the filter chamber 10 in relation to atmospheric pressure and, on the other hand, also when overpressure above a threshold value prevails in the filter chamber 10 in relation to atmospheric pressure. When there is overpressure below the threshold value, the valve assembly 14 remains closed. The threshold value is calculated such that it is slightly above that pressure which can be generated by a fuel column of the height X, that is to say the height difference between the inlet orifice and the tank-side mouth of the filler pipe 2.

When the tank 1 is sealingly closed by means of the cap 3 after being filled, it is accordingly possible to generate in the entire fuel system a limited and correspondingly safe overpressure which makes it possible to check the tightness of the system as a whole. The obtainable overpressure is calculated such that, when the tank is being filled, the filler pipe 2 can no longer or no longer quickly run empty as soon as the tank-filling level is somewhat above the tank-side mouth of the filler pipe. Accordingly, the automatic cut-off mechanism on the fuel-dispensing pump at a filling station can respond reliably and prevent an overfilling of the tank 1, that is to say a free space always remains within the tank 1 above the maximum obtainable fuel level.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fuel supply system for a motor vehicle engine comprising:

a fuel tank, a fuel tank filler pipe which opens into said fuel tank at a vertical level below a top of an interior fuel holding space of the fuel tank, said filler pipe having a fuel inlet opening disposed above said vertical level, a fuel supply and return circuit connected with the fuel tank to provide a closed pressurized engine fuel supply when said filler pipe is closed, a filter chamber, a regenerable filter medium in said filter chamber which is communicated with the fuel tank at a location above fuel level in the fuel tank, an outwardly gas-tight deventilating conduit between the filter chamber and the engine, a filter chamber venting conduit for supplying fresh air to said filter medium to regenerate the filter medium during engine operating conditions, a regenerating valve in said deventilating conduit for selectively controlling flow in said deventilating conduit such that said regenerating valve is open during certain engine operations so that engine operating vacuum pressure acts to draw fresh air through said filter chamber ventilating conduit and filter chamber to regenerate the filter medium, and a control valve assembly in said venting conduit operable to open said ventilating conduit only when
  (i) there is underpressure in the filter chamber in relation to atmospheric pressure, and
  (ii) there is overpressure above a threshold value in the filter chamber in relation to atmospheric pressure, said threshold pressure being predetermined to be slightly above that pressure generated by a fuel column in said filler pipe during fuel filling operation.

2. A fuel supply system for a motor vehicle according to claim 1, wherein the threshold value is somewhat above the value of that maximum pressure which can be generated by fuel received in the filler pipe.

3. A fuel supply system according to claim 1, wherein the filler pipe can be outwardly sealingly closed off.

4. A fuel supply system according to claim 2, wherein the filler pipe can be outwardly sealingly closed off.

* * * * *